US008603954B2

(12) United States Patent
Sauer

(10) Patent No.: US 8,603,954 B2
(45) Date of Patent: Dec. 10, 2013

(54) GRAFT POLYMER AND RELATED METHODS AND COMPOSITIONS

(75) Inventor: Richard P. Sauer, North Plainfield, NJ (US)

(73) Assignee: Castrol Limited (GB)

( * ) Notice: Subject to any disclaimer, the term of this patent is extended or adjusted under 35 U.S.C. 154(b) by 222 days.

(21) Appl. No.: 13/078,410

(22) Filed: Apr. 1, 2011

(65) Prior Publication Data

US 2011/0251112 A1   Oct. 13, 2011

Related U.S. Application Data

(60) Provisional application No. 61/321,659, filed on Apr. 7, 2010.

(51) Int. Cl.
*C10M 159/18* (2006.01)
*C10M 149/10* (2006.01)
*C08F 8/30* (2006.01)
*C08F 251/00* (2006.01)

(52) U.S. Cl.
USPC .......... 508/221; 508/452; 508/455; 508/458; 525/244; 525/245; 525/281

(58) Field of Classification Search
USPC ......... 508/100, 110, 230, 269, 221, 452–458; 525/281, 244, 245
See application file for complete search history.

(56) References Cited

U.S. PATENT DOCUMENTS

| | | |
|---|---|---|
| 3,873,459 A | 3/1975 | Pawlak |
| 3,940,339 A | 2/1976 | Clarke, Jr. et al. |
| 4,089,794 A | 5/1978 | Engel |
| 4,092,255 A | 5/1978 | Chapelet et al. |
| 4,137,185 A | 1/1979 | Gardiner et al. |
| 4,146,489 A | 3/1979 | Stambaugh et al. |
| 4,160,739 A | 7/1979 | Stambaugh et al. |
| 4,234,435 A | 11/1980 | Meinhardt et al. |
| 4,320,019 A | 3/1982 | Hayashi |
| 4,505,834 A | 3/1985 | Papay et al. |
| 4,517,104 A | 5/1985 | Bloch et al. |
| 4,632,769 A | 12/1986 | Gutierrez et al. |
| 4,640,788 A | 2/1987 | Kapuscinski et al. |
| 4,693,838 A | 9/1987 | Varma et al. |
| 4,780,230 A | 10/1988 | Liu et al. |
| 4,810,754 A | 3/1989 | McCrary |
| 4,812,261 A | 3/1989 | Liu et al. |
| 4,863,623 A | 9/1989 | Nalesnik |
| 4,877,834 A | 10/1989 | Liu et al. |
| 4,904,401 A | 2/1990 | Ripple et al. |
| 4,904,404 A | 2/1990 | Liu et al. |
| 4,969,912 A | 11/1990 | Kelman et al. |
| 5,149,895 A | 9/1992 | Coolbaugh et al. |
| 5,167,845 A | 12/1992 | DeRosa et al. |
| 5,167,848 A | 12/1992 | Chung et al. |
| 5,219,480 A | 6/1993 | Gutierrez et al. |
| 5,275,747 A | 1/1994 | Gutierrez et al. |
| 5,294,354 A | 3/1994 | Parke et al. |
| 5,298,565 A | 3/1994 | Lange et al. |
| 5,328,624 A | 7/1994 | Chung |
| 5,346,635 A | 9/1994 | Khorramian et al. |
| 5,424,357 A | 6/1995 | Larson |
| 5,424,367 A | 6/1995 | Auda et al. |
| 5,427,702 A | 6/1995 | Chung et al. |
| 5,439,605 A | 8/1995 | Khorramian |
| 5,523,008 A | 6/1996 | Boden et al. |
| 5,527,624 A | 6/1996 | Higgins et al. |
| 5,563,118 A | 10/1996 | Mishra et al. |
| 5,614,480 A | 3/1997 | Salomon et al. |
| 5,633,415 A | 5/1997 | Brandes et al. |
| 5,637,783 A | 6/1997 | Brandes et al. |
| 5,652,201 A | 7/1997 | Papay et al. |
| 5,663,126 A | 9/1997 | Boden et al. |
| 5,759,967 A | 6/1998 | Song et al. |
| 5,773,524 A | 6/1998 | Coolbaugh et al. |
| 5,780,540 A | 7/1998 | Brandes et al. |
| 5,814,586 A | 9/1998 | Boden et al. |
| 5,874,389 A | 2/1999 | Boden et al. |
| 6,034,038 A | 3/2000 | Lockwood et al. |
| 6,034,184 A | 3/2000 | Coolbaugh et al. |
| 6,054,539 A | 4/2000 | Coolbaugh et al. |
| 6,100,224 A | 8/2000 | Peiffer et al. |
| 6,103,676 A | 8/2000 | Coolbaugh et al. |

(Continued)

FOREIGN PATENT DOCUMENTS

| | | |
|---|---|---|
| CN | 1137283 A | 12/1995 |
| DE | 144 071 | 9/1980 |

(Continued)

OTHER PUBLICATIONS

Aldrich Handbook of Fine Chemicals 1996-1997, p. 986 Cat No. 14607-2.
Citovicky, P., et al., The copolymerization of styrene and maleic anhydride initiated by peroxides of isotactic polypropylene, Eur. Polym. J. (1996) vol. 32, No. 2, 153-158.
Moad, G., The synthesis of polyolefin graft copolymers by reactive extrusion, Prog. Polym. Sci, 24 (1999) 81-142.
Zu. J, et al., The Preparation of Sodium Sulfonatepolyethylene Grafted Membranes, Journal of Radiation Research and Radiation Processing, vol. 1 18(3), 168-169 (2000) with English abstract.
Li, Y., et al., Study on styrene-assisted melt free-radical grafting of maleic anhydride onto polypropylene, Polymer 42 (2001) 3419-3425.

(Continued)

Primary Examiner — Ellen McAvoy
Assistant Examiner — Vishal Vasisth
(74) Attorney, Agent, or Firm — McAndrews, Held & Malloy, Ltd.

(57) ABSTRACT

The present invention relates to a graft polymer of (a) a polyalphaolefin having a weight average molecular weight of less than 15000 and a polydispersity of 1.1 to 10; (b) a nitrogenous, ethylenically unsaturated, aliphatic or aromatic, graftable monomer having from 2 to about 50 carbon atoms; and (c) an organo-metallic compound selected from organo-molybdenum, organo-titanium, organo-manganese compounds and mixtures thereof; a process for making the graft polymer; and a lubricating oil composition comprising a major amount of a base oil and a minor amount of the graft polymer.

24 Claims, No Drawings

(56) References Cited

U.S. PATENT DOCUMENTS

| | | |
|---|---|---|
| 6,107,257 A | 8/2000 | Valcho et al. |
| 6,107,258 A | 8/2000 | Esche, Jr. et al. |
| 6,162,768 A | 12/2000 | Coolbaugh et al. |
| 6,187,721 B1 | 2/2001 | Goldblatt et al. |
| 6,215,033 B1 | 4/2001 | Coolbaugh et al. |
| 6,228,817 B1 | 5/2001 | Coolbaugh et al. |
| 6,248,702 B1 | 6/2001 | Coolbaugh et al. |
| 6,300,289 B1 | 10/2001 | Boden et al. |
| 6,319,881 B1 | 11/2001 | Coolbaugh et al. |
| 6,410,652 B1 | 6/2002 | Goldblatt et al. |
| 6,472,353 B1 | 10/2002 | Smoggie et al. |
| 6,686,321 B2 | 2/2004 | Boden et al. |
| 6,715,473 B2 | 4/2004 | Ritchie et al. |
| 6,750,183 B2 | 6/2004 | Gutierrez et al. |
| 6,759,375 B2 | 7/2004 | Curtis et al. |
| 6,767,871 B2 | 7/2004 | Devlin et al. |
| 6,939,420 B2 | 9/2005 | Pollack |
| 7,144,951 B2 | 12/2006 | Duyck et al. |
| 7,253,231 B2 | 8/2007 | Devlin et al. |
| 7,371,713 B2 | 5/2008 | Goldblatt et al. |
| 7,514,393 B2 | 4/2009 | Goldblatt |
| 7,981,847 B2 | 7/2011 | Goldblatt et al. |
| 8,263,537 B2 | 9/2012 | Goldblatt |
| 2002/0042349 A1 | 4/2002 | Boden et al. |
| 2004/0043909 A1 | 3/2004 | Goldblatt et al. |
| 2004/0259742 A1 | 12/2004 | Mishra et al. |
| 2005/0192407 A1 | 9/2005 | Gauthy |
| 2005/0209113 A1 | 9/2005 | Goldblatt |
| 2006/0003905 A1 | 1/2006 | Devlin et al. |
| 2006/0025316 A1 | 2/2006 | Covitch et al. |
| 2006/0205611 A1 | 9/2006 | Sauer |
| 2007/0149414 A1 | 6/2007 | Ruhe et al. |
| 2008/0293600 A1 | 11/2008 | Goldblatt et al. |

FOREIGN PATENT DOCUMENTS

| | | |
|---|---|---|
| DE | 301 520 A7 | 2/1993 |
| DE | 19607641 A1 | 9/1997 |
| EP | 0000648 | 2/1979 |
| EP | 0336716 | 10/1989 |
| EP | 0352070 | 1/1990 |
| EP | 0352072 | 1/1990 |
| EP | 0438848 | 7/1991 |
| EP | 0837122 | 4/1998 |
| EP | 0927754 | 7/1999 |
| EP | 0980891 | 2/2000 |
| EP | 1533293 | 5/2005 |
| GB | 1390851 | 4/1975 |
| GB | 1531945 | 11/1978 |
| GB | 2097800 | 11/1982 |
| IN | 738/MMNP/2004 | 4/2005 |
| JP | 3031394 A | 2/1991 |
| JP | H10508051 | 8/1998 |
| JP | 2001-524580 A | 12/2001 |
| JP | 2002-146376 A | 5/2002 |
| JP | 2005-42116 A | 2/2005 |
| JP | 2008-1864 A | 1/2008 |
| SG | 112056 | 6/2005 |
| WO | WO 95/16744 | 6/1995 |
| WO | WO 95/18199 | 6/1995 |
| WO | WO 96/12746 | 5/1996 |
| WO | WO 97/47709 | 12/1997 |
| WO | WO 98/17696 | 4/1998 |
| WO | WO 99/27041 | 6/1999 |
| WO | WO 00/37449 | 6/2000 |
| WO | WO 01/19882 | 3/2001 |
| WO | WO 03020853 | 3/2003 |
| WO | WO 03/099890 | 12/2003 |
| WO | WO 2004/106475 | 12/2004 |
| WO | WO 2006084698 | 8/2006 |
| WO | WO 2006/099250 | 9/2006 |
| WO | WO 2006/116663 | 11/2006 |
| WO | WO 2006133848 | 12/2006 |

OTHER PUBLICATIONS

Deng, J. et al., Grafting copolymerization of styrene and maleic anhydride binary monomer systems induced by UV irradiation. Eur. Polym. J. 41 (2005) 2685-2692.

Australian Patent Office Search Report Application No. SG 200406722-9 Feb. 24, 2006.

European Search Report corresponding to European Patent Application Serial No. 04257231.3-2103, dated Mar. 28, 2006.

European Search Report corresponding to European Patent Application Serial No. 03734186.4-1214, dated Aug. 7. 2008, 5 pages.

European Search Report corresponding to European Patent Application Serial No. 08252046.1-2104, dated Feb. 20, 2009.

Russian Patent Office, Official Action issued on May 21, 2010 in Russian Application No. 2007144073/04.

International Search Report corresponding to PCT Patent Application No. PCT/US2011/030251, dated May 31, 2011.

International Search Report and Written Opinion corresponding to PCT Patent Application No. PCT/US2010/056879.

International Search Report and Written Opinion corresponding to PCT Patent Application No. PCT/US2011/030914.

GRAFT POLYMER AND RELATED METHODS AND COMPOSITIONS

This application claims the benefit of priority from U.S. Provisional Patent Application No. 61/321,659, filed Apr. 7, 2010, the entirety of which is expressly incorporated herein by reference.

FIELD OF THE INVENTION

The present invention relates to graft polymers. The present invention further relates to a method of making such graft polymers. The invention still further relates to a lubricating oil composition containing such novel graft polymers as an additive.

Lubricating oil compositions used to lubricate internal combustion engines contain a base oil of lubricating viscosity, or a mixture of such oils, and additives used to improve the performance characteristics of the oil. For example, additives may be used to improve detergency, to reduce engine wear, to provide stability against heat and oxidation, to reduce oil consumption, to inhibit corrosion, to act as dispersants, and/or to reduce friction loss. Some additives contribute to more than one performance characteristic, for example, dispersant/viscosity modifiers. Some additives, while improving one characteristic of the lubricating oil, may have an adverse effect on other characteristics. Since each additive adds to the overall cost of the lubricating oil composition, it is beneficial to employ multi-functional additives that contribute to more than one performance characteristic of the lubricating oil.

WO 2006/099250 relates to a multiple function polymer comprising a graft polymer of a polyolefin, a nitrogenous, ethylenically unsaturated, aliphatic or aromatic monomer having from 2 to about 50 carbon atoms, and an organo-metallic compound capable of reacting with said polyolefin. The multiple function graft polymer is said to operate as a dispersant viscosity index improver, as well as an anti-wear additive without having an adverse effect on anti-oxidant properties. In one aspect of the invention of WO 2006/099250 the polyolefin is said to have a weight average molecular weight from about 20000 to about 500000 and a polydispersity of from about 1 to about 15. In some aspects of the invention of WO 2006/099250, the organo-metallic compounds are molybdenum compounds.

Although the use of such multiple function graft polymers as additives in lubricating oils may impart a viscosity index improving effect on the oil, it has been found that where the polyolefin of the grafted polymer has a high molecular weight, such use may also have an adverse effect on the low temperature properties of the lubricating oil, for example, it may cause thickening of the oil at low temperatures. When used as an internal combustion engine lubricant, this may hinder engine start up in cold weather and/or may impede pumpability and/or flowability of the oil which may lead to engine damage, for example, caused by insufficient lubrication.

Thus, there remains a need for an alternative graft polymer for use as an additive in lubricating oils.

According to a first aspect of the present invention there is provided a graft polymer of (a) a polyalphaolefin having a weight average molecular weight of less than 15000 and a polydispersity of 1.1 to 10; (b) a nitrogenous, ethylenically unsaturated, aliphatic or aromatic, graftable monomer having from 2 to about 50 carbon atoms; and (c) an organo-metallic compound selected from organo-molybdenum, organo-titanium, organo-manganese compounds and mixtures thereof.

According to a second aspect of the present invention there is provided a process for making the graft polymer as described above comprising the steps of (a) contacting, in one or more steps: (i) a polyalphaolefin having a weight average molecular weight of less than 15000 and a polydispersity of 1.1 to 10; (ii) a nitrogenous, ethylenically unsaturated, aliphatic or aromatic, graftable monomer having from 2 to about 50 carbon atoms; and (iii) a free-radical initiator; at a temperature exceeding the initiation temperature of the initiator; (b) contacting the product of step (a) and an organo-metallic compound, selected from organo-molybdenum, organo-titanium, organo-manganese compounds and mixtures thereof, with an initiator at a temperature exceeding the initiation temperature of the initiator.

The present invention solves the problem defined above by the use of a low molecular weight polyalphaolefin. It has now been found that by employing low molecular weight polyalphaolefins in graft polymers good low temperature properties may be achieved.

Further, it has been unexpectedly found that when the graft polymer of the present invention is used as an additive in a lubricating oil composition it provides improved anti-wear, oxidative stability and shear stability performance characteristics compared to graft polymers having a high molecular weight polyolefin backbone.

The polyalphaolefin having a weight average molecular weight of less than 15000 provides a backbone for grafting in the graft polymer.

The nitrogenous, ethylenically unsaturated, aliphatic or aromatic, graftable monomer having 2 to about 50 carbon atoms may contribute dispersancy performance characteristics to the polymer, for example for sludge and varnish handling, when the graft polymer is employed as an additive in a lubricating oil composition.

The organo-metallic compound may contribute anti-wear performance characteristics to the polymer when the graft polymer is employed as an additive in a lubricating oil composition.

The graft polymer may contain from about 0.50 to about 5.0 moles of graftable monomer per mole of polyalphaolefin.

The graft polymer may contain from about 1.0 to about 5.0 moles of organo-metallic compound per mole of polyalphaolefin.

The Polyalphaolefin

The polyalphaolefin of the graft polymer has a weight average molecular weight of less than 15000 and a polydispersity of 1.1 to 10. Suitable polyalphaolefins are known in the art.

The polyalphaolefin preferably has a weight average molecular weight of less than 10000, more preferably less than 8000, for example, in the range 2000 to 6000.

The polyalphaolefin preferably has a polydispersity from about 1.4 to about 3.0. The polydispersity of the polyalphaolefin may be determined by Gel Permeation Chromatography (GPC).

Suitable polyalphaolefins include polyalphaolefins of ethylene and/or propylene and homopolymers of $C_{10}$ to $C_{12}$ olefins, for example, a homopolymer of a $C_{10}$ olefin or a homopolymer of a $C_{10}$ and a $C_{12}$ olefin. A preferred polyalphaolefin is a homopolymer of a $C_{10}$ olefin, for example, a homopolymer of 1-decene.

Particularly preferred polyalphaolefins include Synton 40™ and Synton 100™ available from Chemtura Corporation, Lucant HC-40™ and Lucant HC-100™ available from Mitsui Petrochemical, and Durasyn 174™ (PAO 40) and Durasyn 180™ PAO 100) available from Ineos.

Graftable Monomer

Suitable nitrogenous, ethylenically unsaturated, aliphatic or aromatic, graftable monomers for use in the present invention include: N-vinylimidazole (also known as 1-vinylimidazole), 1-vinyl-2-pyrrolidinone, C-vinylimidazole, N-allylimidazole, 1-vinylpyrrolidinone, 2-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpiperazines, vinylpiperidines, and vinylmorpholines, as well as combinations of these materials or other similar materials.

The graftable monomer is preferably N-vinylimidazole.

Organo-Metallic Compound

Organo-molybdenum compounds suitable for use in the present invention include molybdenum boro neodecanoate, molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36+}$-$C_{18}$ branched-linear carboxylate, molybdenum $C_{36}$ branched-linear carboxylate, molybdenum $C_{36}/C_{36+}$ linear carboxylate, molybdenum $C_{36+}$ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate. Suitable organo-molybdenum compounds may be obtained from Shepherd Chemical Company, 4900 Beech Street, Norwood, Ohio 45212-2398.

Organo-titanium compounds suitable for use in the present invention include titanium diisopropoxide bis(acetylacetonate), titanium (IV) 2-ethylhexoxide, titanium (IV) isopropoxide, titanium methoxide, titanium ethoxide, titanium (IV) propoxide, titanium (IV) tert-butoxide.

Organo-manganese compounds suitable for use in the present invention include manganese oleate, manganese linoleate, manganese octoate, manganese acetate, manganese stearate, manganese II 2,4-pentanedioate and manganese III 2,4-pentanedioate.

Were the organo-metallic compound is an organo-molybdenum compound, the organo-molybdenum compound is preferably selected from molybdenum acetylacetonate, molybdenum boro neodecanoate, molybdenum octoate and mixtures thereof.

Where the organo-metallic compound is an organo-titanium compound, the organo-titanium compound is preferably titanium diisopropoxide bis(acetylacetonate).

Where the organo-metallic compound is an organo-manganese compound, the organo-manganese compound is preferably manganese oleate.

Free-Radical Initiators

Suitable initiators include "peroxy" initiators, for example, alkyl, dialkyl, and aryl peroxides, for example: di-t-butyl peroxide (abbreviated herein as "DTBP"), dicumyl peroxide, t-butyl cumyl peroxide, benzoyl peroxide, 2,5-dimethyl-2,5-di(t-butylperoxy)hexane, and 2,5-dimethyl-2,5-di(t-butylperoxy)hexyne-3; peroxyester and peroxyketal initiators, for example: t-butylperoxy benzoate, t-amylperoxy benzoate, t-butylperoxy acetate, t-butylperoxy benzoate, di-t-butyl diperoxyphthalate, and t-butylperoxy isobutyrate; hydroperoxide initiators, for example: cumene hydroperoxide, t-butyl hydroperoxide, and hydrogen peroxide; azo initiators, for example: 2-t-butylazo-2-cyanopropane, 2-t-butylazo-1-cyanocyclohexane, 2,2'-azobis(2,4-dimethylpentane nitrile), 2,2-azobis(2-methylpropane nitrile), 1,1'-azobis(cyclohexanecarbonitrile), and azoisobutyronitrile (AIBN); and other similar materials such as, diacyl peroxides, ketone peroxides and peroxydicarbonates. Combinations of more than one initiator, including combinations of different types of initiators, may be employed.

Preferably the free radical initiator employed is di-t-butyl peroxide.

Free-radical initiators commonly have a characteristic minimum temperature, above which they will readily initiate a reaction and below which initiation will proceed more slowly or not at all. This temperature is defined as the initiation temperature. Consequently, the minimum reaction temperature is commonly directed by the minimum initiation temperature of the free-radical initiator, Solvent Reaction Conditions Steps (a) and (b) of the process of the present invention may be carried out in a solvent.

For example, the polyalphaolefin may be dissolved in a solvent, which may be hydrocarbon base oil for a lubricating composition or another suitable solvent, to form a solution. The solution thus formed may be placed in a suitable reactor such as a resin kettle with a $CO_2$ purge over the surface of the reaction mixture and the solution heated to a temperature exceeding the initiation temperature of the initiator to be used (the reaction temperature). For example, if di-t-butyl peroxide (DTBP) is used as the initiator the reaction temperature should be greater than about 165° C., alternatively greater than about 170° C. alternatively greater than 175° C. Different initiators work at different rates for a given reaction temperature. Therefore, the choice of a particular initiator may require adjustment of reaction temperature or time.

The graftable monomer may be added to the polyalphaolefin solution and dissolved. The contemplated proportions of the graftable monomer to polyalphaolefin may be selected so that an effective percentage will graft directly onto the polyalphaolefin backbone.

The graftable monomer may be introduced into the solution all at once, in several discrete charges, or at a steady rate over an extended period. The desired minimum rate of addition of the graftable monomer to the solution is at least about 0.1% and the maximum rate of addition is 100% of the necessary total amount of graftable monomer per minute.

The initiator can be added to the solution before, with or after the graftable monomer. The initiator may be added in discreet charges or all at once. In one embodiment the initiator may be added with the graftable monomer over a period of one hour. The desired rate of addition of the initiator to the solution may be at least about 0.1%, alternatively at least about 5%, and alternatively at least about 20% of the necessary total amount of initiator per minute.

Although the initiator can be added neat, it is preferably diluted with a solvent or dispersing medium to avoid high localized concentrations of the initiator as it enters the reactor. In a preferred embodiment, it is substantially diluted with the same solvent used to dissolve the polyalphaolefin. The initiator can be diluted by at least 5 times, alternatively at least about 10 times, alternatively at least about 20 times its weight or volume with a suitable solvent or dispersing medium.

After addition of initiator and graftable monomer to the solution is completed, the reaction mixture is preferably mixed with heating for an additional 2-120 minutes, to complete reaction. The time required for completion of the reaction can be determined by experiment, by determining when the proportion of nitrogen, or of the graftable monomer in solution, reaches a value at or approaching a minimum pre-established value, or when the viscosity approaches a near constant value. A test method which may be used to determine percent nitrogen can be found in U.S. Pat. No. 5,523,008 col. 11 lines 35 to col. 12 line 67, the contents of which are hereby incorporated by reference.

The organo-metallic compound may then be introduced into the solution, whilst maintaining the reaction temperature. The contemplated proportions of the organo-metallic compound to graftable monomer are selected so that an effective percentage will coordinate or react with the product of step (a). The organo-metallic compound may be introduced into the solution all at once, in several discrete charges, or at a steady rate over an extended period. The desired minimum rate of addition of the organometallic compound to the reaction mixture is at least about 0.1% and the maximum rate of addition is 100% of the necessary total amount of organo-metallic compound per minute.

The solution may be mixed thoroughly to incorporate the organo-metallic compound. After addition of organo-metallic compound is completed, the reaction mixture is preferably mixed with heating and a $CO_2$ purge for an additional 2-120 minutes, to complete reaction.

Alternatively, a further initiator can be added before, with or after the organo-metallic compound. The initiator may be added in discreet charges or all at once. In one embodiment the initiator is added over a period of one hour after the organo-molybdenum compound is mixed thoroughly with the reaction mixture.

Lubricating Oil Composition

According to a third aspect of the present invention there is provided a lubricating oil composition comprising a major amount of a base oil and a minor amount of one or more graft polymers as described herein, or as prepared according to the process described herein. The lubricating oil composition may be used to lubricate an internal combustion engine, for example, a spark ignition combustion engine or a compression ignition internal combustion engine.

Base Oil

Any mineral, petroleum, synthetic or semi-synthetic base oil or mixtures thereof may be employed as the base oil in the lubricating oil composition of the present invention. Suitable base oils include, for example, EHC-45 and EHC-60 available from ExxonMobil, P1003, P2305 and P5300 available from Petrocanada, and FHR100, FHR230 and FHR600 available from Flint Hills Refinery.

The base oil may be present in the lubricating oil composition in an amount of from about 75% to about 90% by weight, for example about 85% by weight (including base oil carried over from the making of the grafted polymer).

Graft Polymer

The one or more graft polymers may be present in the lubricating oil composition in an amount of from about 0.2% to about 5% by weight (not including any base oil carried over from the making of the grafted polymer).

Where the organo-metallic compound is an organo-molybdenum compound, the graft polymer may be present in the lubricating oil composition in an amount of from about 0.2% to about 2% by weight, preferably from about 0.5% to about 1% by weight, for example, about 0.7% by weight.

Where the organo-metallic compound is an organo-titanium compound, the graft polymer may be present in the lubricating oil composition in an amount of from about 1% to about 2% by weight, preferably from about 1% to about 1.5% by weight, for example, about 1.4% by weight.

Where the organo-metallic compound is an organo-manganese compound, the graft polymer may be present in the lubricating oil composition in an amount of from about 0.2% to about 2% by weight, for example, about 0.7% by weight.

The lubricating oil compositions of the present invention may further comprise one or more other additives in addition to the multiple function grafted copolymer. In particular, the lubricating oil composition may further comprise one or more of viscosity index improvers, dispersants, detergents, anti-wear additives, antioxidants and pour point depressants.

The grafted polymer of the present invention can be used in place of part, or all, of known viscosity index improving polyolefins conventionally used in lubricating oil compositions. They can also be used in place of part or all of known anti-wear agents used in lubricating oil compositions, as they may possess anti-wear and/or friction modification properties.

Viscosity Index Improvers

Viscosity index improving polyolefins, such as long-chain polyolefins, may be used in lubricating oil compositions according to the present invention. Suitable polyolefins include: polyisobutenes, polymethacrylates, polyalkylstyrenes, partially hydrogenated copolymers of butadiene and styrene, amorphous polyolefins of ethylene and propylene, ethylene-propylene diene polymers, polyisoprene, and styrene-isoprene.

The lubricating oil composition may comprise from about 0.2% to about 1.2% by weight, for example about 0.6% by weight, of one or more viscosity index improvers, other than the graft polymer.

Dispersants

Dispersants may help suspend insoluble lubricating oil oxidation products, thus preventing or reducing sludge flocculation and/or precipitation or deposition of particulates on metal parts. Suitable dispersants for use in the lubricating oil composition of the present invention include high molecular weight alkyl succinimides and the reaction products of oil-soluble polyisobutylene succinic anhydride with ethylene amines such as tetraethylene pentamine and borated salts thereof. For example, succinimides or succinic esters, alkylated with a polyolefin of isobutene or propylene, on the carbon in the alpha position of the succinimide carbonyl may be employed. These additives are useful for maintaining the cleanliness of an engine or other machinery.

The lubricating oil composition may comprise from about 1% to about 8% by weight, for example about 2.5% by weight, of one or more dispersants, other than the multiple function graft polymer.

Detergents

Detergents which may contribute to maintaining engine cleanliness of lubricated systems (for example, internal combustion engines) can be used in the lubricating oil compositions. These materials include the metal salts of sulfonic acids, alkyl phenols, sulfurized alkyl phenols, alkyl salicylates, naphthenates, and other soluble mono- and dicarboxylic acids. Basic (vis, overbased) metal salts, for example basic alkaline earth metal sulfonates (especially calcium and magnesium salts) are frequently used as detergents. Such detergents are particularly useful for helping to keep the insoluble particulate materials in an engine or other machinery in suspension. Other suitable detergents include sulfonates, phenates, or organic phosphates of polyvalent metals.

The lubricating oil composition preferably comprises about 2% by weight of one or more detergents.

Anti-Wear Additives

Anti-wear additives may reduce wear of surfaces (for example metal parts) lubricated by the lubricating oil composition. Zinc dialkyldithiophosphates and zinc diaryldithiophosphates and molybdenum dialkyldithiocarbamates are representative of conventional anti-wear agents, but which contain sulfur and phosphorous components that can poison automotive emission catalysts. Use of known anti-wear agents can be reduced or eliminated by the use of the grafted polymer of the present invention.

The lubricating oil composition may comprise from 0.5% to 2% by weight, for example about 1.2% by weight, of one or more anti-wear additives other than the multiple function graft polymer.

Anti-Oxidants

Oxidation inhibitors, or anti-oxidants, may reduce the tendency of lubricating oils to deteriorate in service. This deterioration may be evidenced by increased oil viscosity and by the products of oxidation such as sludge and varnish-like deposits on lubricated surfaces, for example, metal surfaces. Such oxidation inhibitors include alkaline earth metal salts of alkylphenolthioesters having preferably $C_5$ to $C_{12}$ alkyl side chains, e.g. calcium nonylphenol sulfide, dioctylphenylamine, phenyl-alpha-naphthylamine, phosphosulfurized or sulfurized hydrocarbons, and organo molybdenum compounds such as molybdenum dialkyldithiocarbamates.

The lubricating oil composition may comprise from 0.2% to 2% by weight, for example about 1.2% by weight, of one or more anti-oxidants.

Pour Point Depressants

Pour point depressants, otherwise known as lube oil flow improvers, may lower the temperature at which a fluid will flow or can be poured. These may be present in the lubricating oil composition. Such additives are known. Conventional pour point depressants which contribute to the low temperature fluidity of a lubricant include $C_8$-$C_{18}$-dialkylfumarate vinyl acetate copolymers, and polymethacrylates.

The lubricating oil composition may comprise from 0.1% to 1% by weight, for example about 0.35% by weight, of one or more pour point depressants.

The lubricating oil composition may further comprise other additives, such as rust inhibitors, extreme pressure additives, friction modifiers, antifoam additives, and dyes.

The invention will now be illustrated by way of example only with reference to the following Examples.

Methods of Making the Multiple Function Graft Polymers

EXAMPLE 1

A 500 gram sample of poly-alpha olefin (PAO 100) having a weight average molecular weight of approximately 5600 and a polydispersity of 1.60 was charged to a glass reactor. The PAO 100 was supplied by Chemtura Corporation under the brand name of Synton 100™. The PAO 100 was then heated to 170° C. with a $CO_2$ purge over its surface. 2.00% by weight of 1-vinylimidazole (VIMA BASF Corp.) and 1.00% by weight of di-t-butyl peroxide (DTBP Aldrich Chemical #16, 8521-1) were then added simultaneously to the PAO 100 over a 60-minute period. The resulting reaction mixture was then allowed to mix for 30 additional minutes to form a first reaction product. This reaction was followed by a second reaction.

The second reaction began by heating and/or maintaining the first reaction product to or at 1.70° C. Then 4.90% by weight of molybdenum boro-dodecylbenzenesulfonate, obtained from Shepherd Chemical Company, was added to the first reaction product over a 1 minute period and the resulting reaction mixture allowed to mix thoroughly. The reaction mixture was allowed to continue mixing with heating and a $CO_2$ purge for 60 additional minutes to form a second reaction product.

The second reaction product contained a graft polymer according to the present invention.

EXAMPLE 2

A 500 gram sample of poly-alpha olefin (PAO 100) having a weight average molecular weight of approximately 5600 and a polydispersity of 1.60 was charged to a glass reactor. The PAO 100 was supplied by Chemtura Corporation and as Synton 100™. The PAO 100 was then heated to 170° C. with a $CO_2$ purge over its surface. 1.00% by weight of 1-vinylimidazole (VIMA BASF Corp.) and 0.5% by weight of di-t-butyl peroxide (DTBP Aldrich Chemical #16, 8521-1) were then added simultaneously to the PAO 100 over a 60-minute period. The resulting reaction mixture was then allowed to mix for 30 additional minutes to form a first reaction product. This reaction was followed by a second reaction.

The second reaction began by heating and/or maintaining the first reaction product to or at 170° C. Then 4.90% by weight of molybdenum boro-dodecylbenzenesulfonate, obtained from Shepherd Chemical Company, was added to the first reaction product over a 1 minute period and the resulting reaction mixture allowed to mix thoroughly. The reaction mixture was allowed to continue mixing with heating and a $CO_2$ purge for 60 additional minutes to form a second reaction product.

The second reaction product contained a graft polymer according to the present invention.

EXAMPLE 3

A 500 gram sample of poly-alpha olefin (PAO 100) having a weight average molecular weight of approximately 5600 and a polydispersity of 1.60 was charged to a glass reactor. The PAO 100 was supplied by Chemtura Corporation as Synton 100™. The PAO 100 was then heated to 170° C. with a $CO_2$ purge over its surface. 1.00% by weight of 1 vinylimidazole (VIMA BASF Corp.) and 0.6% by weight of di-t-butyl peroxide (DTBP Aldrich Chemical #16, 8521-1) were then added simultaneously to the PAO 100 over a 60-minute period. The resulting reaction mixture was then allowed to mix for 30 additional minutes to form a first reaction product. This reaction was followed by a second reaction.

The second reaction began by heating and/or maintaining the first reaction product to or at 170° C. Then 4.00% by weight of molybdenum boro-neodecanoate, obtained from Shepherd Chemical Company, was added to the first reaction product over a 1 minute period and the resulting reaction mixture allowed to mix thoroughly. The reaction mixture was allowed to continue mixing with heating and a $CO_2$ purge for 60 additional minutes to form a second reaction product.

The second reaction product contained a graft polymer according to the present invention.

EXAMPLE 4

A 500 grain sample of poly-alpha olefin (PAO 100) having a weight average molecular weight of approximately 5600 and a polydispersity of 1.60 was charged to a glass reactor. The PAO 100 was supplied by Chemtura Corporation and as Synton 100™. The PAO 100 was then heated to 170° C. with a $CO_2$ purge over its surface. 0.50% by weight of 1-vinylimidazole (VIMA BASF Corp.) and 0.30% by weight of di-t-butyl peroxide (DTBP Aldrich Chemical #16, 8521-4) were then added simultaneously to the PAO 100 over a 60-minute period. The resulting reaction mixture was then allowed to mix for 30 additional minutes to form a first reaction product. This reaction was followed by a second reaction.

The second reaction began by heating and/or maintaining the first reaction product to or at 170° C. Then 2.00% by weight of molybdenum boro-neodecanoate, obtained from Shepherd Chemical Company, was added to the first reaction product over a 1 minute period and the resulting reaction mixture allowed to mix thoroughly. The reaction mixture was allowed to continue mixing with heating and a $CO_2$ purge for 60 additional minutes to form a second reaction product.

The second reaction product contained a graft polymer according to the present invention.

EXAMPLE 5

The graft polymer of Example 5 was prepared in the same way as Example 3 except that 8.00% by weight of molybdenum boro-neodecanoate was added to the first reaction product instead of 4.00%.

EXAMPLE 6

A 500 gram sample of poly-alpha olefin (PAO 100) having a weight average molecular weight of approximately 5600 and a polydispersity of 1.60 was charged to a glass reactor. The PAO 100 was supplied by Chemtura Corporation and is sold under the brand of Synton 100™. The PAO 100 was then heated to 170° C. with a $CO_2$ purge over its surface. 1.00% by weight of 1-vinylimidazole (IRMA BASF Corp.) and 0.60% by weight of di-t-butyl peroxide (DTBP Aldrich Chemical #16, 8521-1) were then added simultaneously to the PAO 100 over a 60-minute period. The resulting reaction mixture was then allowed to mix for 30 additional minutes to form a first reaction product. This reaction was followed by a second reaction.

The second reaction began by heating and/or maintaining the first reaction product to or at 170° C. Then 4.00% by weight of titanium acetylacetanoate (Tyzor AA), obtained from DuPont Chemical Company, was added to the first reaction product over a 1 minute period and the resulting reaction mixture allowed to mix thoroughly. 0.30% by weight of di-t-butyl peroxide, obtained from Aldrich Chemical Company, was then added to the reaction mixture over a 60 minute period. The reaction mixture was then allowed to continue mixing with heating and a $CO_2$ purge for 30 additional minutes to form a second reaction product.

The second reaction product contained a graft polymer according to the present invention.

EXAMPLE 7

A 500 gram sample of poly-alpha olefin (PAO 40) having a weight average molecular weight of approximately 2500 and a polydispersity of 1.60 was charged to a glass reactor. The PAO 40 was supplied by Chemtura Corporation and is sold under the brand of Synton 40™. The PAO 40 was then heated to 170° C. with a $CO_2$ purge over its surface. 1.00% by weight of 1-vinylimidazole (VIMA BASE Corp.) and 0.60% by weight of di-t-butyl peroxide (DTBP Aldrich Chemical #16, 8521-1) were then added simultaneously to the PAO 40 over a 60-minute period. The resulting reaction mixture was then allowed to mix for 30 additional minutes to form a first reaction product. This reaction was followed by a second reaction.

The second reaction began by heating and/or maintaining the first reaction product to or at 170° C. Then 4.00% by weight of titanium acetylacetanoate (Tyzor AA), obtained from DuPont Chemical Company, was added to the first reaction product over a 1 minute period and the resulting reaction mixture allowed to mix thoroughly. 0.30% by weight of di-t-butyl peroxide, obtained from Aldrich Chemical Company, was then added to the reaction mixture over a 60 minute period. The reaction mixture was then allowed to continue mixing with heating and a $CO_2$ purge for 30 additional minutes to form a second reaction product.

The second reaction product contained a graft polymer according to the present invention.

Testing of Lubricating Oil Compositions Comprising the Multiple Function Graft Polymer The following tests were carried out on several fully formulated lubricating oil compositions.

Oils 1 to 4 each comprised a graft polymer of (a) a polyalphaolefin having a weight average molecular weight of less than 15000 and a polydispersity of 1.1 to 10; (b) a nitrogenous, ethylenically unsaturated, aliphatic or aromatic, graftable monomer having from 2 to about 50 carbon atoms; and (c) an organo-metallic compound selected from organo-molybdenum, organo-titanium, organo-manganese compounds and mixtures thereof. Thus, oils 1 to 4 are lubricating oil compositions according to the present invention.

Comparative Oils A-C did not comprise a graft polymer of (a) a polyalphaolefin having a weight average molecular weight of less than 15000 and a polydispersity of 1.1 to 10; (b) a nitrogenous, ethylenically unsaturated, aliphatic or aromatic, graftable monomer having from 2 to about 50 carbon atoms; and (c) an organo-metallic compound selected from organo-molybdenum, organo-titanium, organo-manganese compounds and mixtures thereof. Thus, Oils A to C are not lubricating oil compositions according to the present invention, Shear Stability The Permanent Shear Stability Index (PSSI) of oils 1 and A was determined according to ASTM D6022-06.

Oil 1 comprised 3% by weight of the graft polymer of Example 3.

Oil A comprised 6% by weight of a graft polymer of a polyalphaolefin having a weight average molecular weight of approximately 150000, a nitrogenous ethylenically unsaturated graftable monomer having from 2 to 50 carbon atoms and an organo-metallic compound.

The Permanent Shear Stability Index (PSSI) of a lubricating oil composition is a measure of the loss of viscosity, due to shearing, contributed by a specified additive. An improved shear stability index means that a lubricating oil composition will resist changes in viscosity for a longer period of time, which thereby provides improved engine lubrication.

The results of the shear stability testing show that the PSSI of oil 1 is improved by 46% compared to the PSSI of comparative oil A.

These results demonstrate that lubricating oils comprising graft polymers of the present invention as additives will resist changes in viscosity for a longer period of time, thereby providing a higher level of lubrication.

Low Temperature Properties

The viscosity of oils 1 and A was measured at −35° C. using a mini rotary viscometer (MRV) according to the method of ASTM D4684-02a.

An oil having an MRV-measured viscosity of 40000 cP at −35° C. or greater is considered to be an oil which may cause engine failure due to lack of oil pumpability when used in an engine at low temperatures.

Further, the gelation index (GI) of oils 1 and A was measured using the Scanning Brookfield Technique according to international standard ASTM D 5133-01.

The gelation index of an oil indicates the oil's tendency to form a gelated structure at low temperatures. An oil having a gelation index of 12 or greater is considered to be an oil which may cause engine failure due to insufficient lubrication when used in an engine at low temperatures.

Further, both the MRV viscosity and gelation index (GI) measurements for oils 1 and A were repeated except that an additional 0.2% by weight of a pour point depressant (ppd) was blended into each of the oils.

The MRV and SB viscosities of oils 1 and A, with and without the additional pour point depressant, are shown in Table 1.

TABLE 1

|  | Oil 1 | Oil A |
|---|---|---|
| MRV (cP) without additional ppd | 28002 | 39610 |
| MRV (cP) with additional ppd | 22391 | 19779 |
| GI without additional ppd | 3.5 | FAIL |
| GI with additional ppd | 3.5 | 3.8 |

From Table 1 it can be seen that without the additional pour point depressant the MRV viscosity of comparative oil A is very close to the 40000 cP limit at which an oil may cause engine failure due to lack of oil pumpability when used in an engine at low temperatures, whereas the MRV viscosity of oil 1 is significantly lower than 40000 cP. Only when additional pour point depressant is present, does comparative oil A have an acceptable MRV viscosity.

It can also be seen from Table 1 that without the additional pour point depressant the gelation index of comparative oil A exceeds the fail limit, whereas the gelation index of oil 1 is below the fail limit. Only when additional pour point depressant is present does comparative oil A have an acceptable gelation index.

Thus, the results shown in Table 1 demonstrate that improved low temperature properties can be achieved by employing graft polymers of the present invention as additives in lubricating oil compositions.

High Temperature High Shear Viscosity

The high temperature high shear (HTHS) viscosities of oils 1 and A were measured according to the method of ASTM D4741.

The high temperature high shear (HTHS) viscosity of a lubricating oil composition is a measure of the oils viscosity under severe temperature and shear conditions which may be encountered in internal combustion engines. A higher HTHS viscosity indicates better maintenance of oil film thickness under severe operating conditions.

The HTHS viscosities of oils 1 and A are shown in Table 2.

TABLE 2

| HTHS viscosity [cP] | |
|---|---|
| Oil 1 | Oil A |
| 2.998 | 2.86 |

From Table 2 it can be seen that the HTHS viscosities of oil 1 is significantly higher than the HTHS viscosity of comparative oil A.

Thus, the results shown in Table 2 demonstrate that by employing graft polymers of the present invention as additives in lubricating oil compositions improved high temperature, high shear properties may be achieved.

Sequence IVA Valve Train Wear Evaluation

A sequence IVA test was performed on three fully formulated 5W-30 lubricating oil compositions: Oil 2, Oil 3 and comparative Oil B.

Oil 2 comprised 0.5% by weight of the graft polymer of Example 5.

Oil 3 comprised 1.4% by weight of the graft polymer of Example 7.

Oil B did not comprise a graft polymer of the present invention.

The Sequence IVA engine valve train wear test is a fired engine-dynamometer lubricant test which evaluates the ability of a test lubricant to reduce camshaft lobe wear. The test method is a low temperature cyclic test, with a total running duration of 100 hours.

A 1994 Nissan model KA24E water cooled, 4 cycle, in-line cylinder, 2.389 (2.4) litre engine is used as the test apparatus. The engine incorporates a single overhead cam (SOHC), three valves per cylinder (2 intake; 1 exhaust), and sliding follower valve train design. An engine shortblock is utilized for 16 tests; a cylinder head assembly for 8 tests; and the critical test parts (camshaft, rocker arms, rocker shafts) are replaced every test. A 95 minute break-in schedule is conducted whenever the long block or cylinder head is replaced (before tests 1 and 9).

The Sequence IVA test is a flush and run type of lubricant test. Each individual test consists of two 20-minute flushes, followed by the 100-hour cyclic test. The cyclic test is comprised of 100 hourly cycles. Each cycle consists of two stages. The idle speed Stage 1 duration is 50 minutes; the 1500 r/min stage 2 operates for 10 minutes. The stages of the test cycle are set at the conditions shown in Table 3.

TABLE 3

| Parameter | Units | Stage 1 | Stage 2 |
|---|---|---|---|
| Duration | Min | 50 | 10 |
| Engine Speed | r/min | 800 | 1500 |
| Engine Torque | N-m | 25 | 25 |
| Coolant Out Temperature | °C. | 50 | 55 |
| Oil Cylinder Head Temperature | °C. | 49 | 59 |
| Intake Air Temperature | °C. | 32 | 32 |
| Intake Air Pressure | kPa | 0.050 | 0.050 |
| Intake Air Humidity | g/kg | 11.5 | 11.5 |
| Exhaust Pressure | kPa-abs | 103.5 | 103.5 |
| Coolant Flow | L/min | 30 | 30 |
| Fresh Air Flow | SL/min | 10 | 10 |

Upon test completion, the camshaft was removed from the engine and measured for individual lobe wear at seven prescribed locations (nose; 14 degrees before and after the nose; 10 degrees before and after the nose; 4 degrees before and after the nose). For each lobe, the seven locations are summed to determine the lobe wear. Then the twelve lobes are averaged to compute the final test result. The results of the test are shown in Table 4 below.

TABLE 4

| Test Parameter | Oil B | Oil 2 | Oil 3 |
|---|---|---|---|
| Average Cam Wear in microns | 123.78 | 64.9 | 65.78 |
| Fe ppm @ 100 hours | 158 | 99 | 96 |
| Intake Lobe Average wear in microns | 142.12 | 78.9 | 74.84 |
| Exhaust Lobe average wear in microns | 125.01 | 74.98 | 47.65 |
| Nose average wear in microns | 19.41 | 11.04 | 9.72 |

The results in Table 4 demonstrate that the graft polymer of the present invention significantly reduces cam, lobe, exhaust and nose wear as well as reduces the ppm of iron found in the oil after 100 hours. The multiple function graft polymer may thus be used as an additive which contributes to anti-wear performance characteristics in a lubricating oil composition. Thermo-Oxidation Engine Oil Simulation Test (TEOST 33C)

A TEOST 33c test was performed on Oil 4 and comparative Oil C.

Oil 4 comprised 1.4% by weight of the graft polymer of Example 7.

Oil C did not comprise a graft polymer of the present invention.

The TEOST 33C test measures the amount of deposits (in mg) formed by automotive engine oils utilizing the thermo-oxidation engine oil simulation test (TEOST). The test was conducted in accordance with ASTM. D-6335. The results of the TEOST test are found in Table 5.

TABLE 5

|  | Oil C | Oil 4 |
|---|---|---|
| Deposits (mg) | 18.1 | 12.5 |

Table 5 demonstrate that the graft polymer of the present invention significantly reduces the amount of deposits formed when used as an additive in a lubricating oil composition in an internal combustion engine. Thus, the graft polymer of the present invention provides improved oxidative stability performance characteristics.

The invention claimed is:

1. A graft polymer of: (a) a polyalphaolefin having a weight average molecular weight of less than 15000 and a polydispersity of 1.1 to 10; (b) a nitrogenous, ethylenically unsaturated, aliphatic or aromatic, graftable monomer having from 2 to about 50 carbon atoms grafted onto said polyalphaolefin; and (c) an organo-metallic compound reacted with said grafted monomer, wherein the organo-metallic compound is selected from organo-molybdenum, organo-titanium, organo-manganese compounds and mixtures thereof.

2. A process for making the graft polymer as claimed in claim 1 comprising the steps of (a) contacting, in one or more steps: (i) a polyalphaolefin having a weight average molecular weight of less than 15000 and a polydispersity of 1.1 to 10; (ii) a nitrogenous, ethylenically unsaturated, aliphatic or aromatic, graftable monomer having from 2 to about 50 carbon atoms; and (iii) a free-radical initiator; at a temperature exceeding the initiation temperature of the initiator; (b) contacting the product of step (a) and an organo-metallic compound, selected from organo-molybdenum, organo-titanium, organo-manganese compounds and mixtures thereof.

3. A graft polymer as claimed in claim 1 wherein the polymer contains from about 0.5 to about 5.0 moles of graftable monomer per mole of polyalphaolefin.

4. A graft polymer as claimed in claim 1 wherein the polymer contains from about 1.0 to about 5.0 moles of organo-molybdenum compound per mole of polyalphaolefin.

5. A graft polymer as claimed in claim 1 wherein the polyalphaolefin has a weight average molecular weight of less than 10000.

6. A graft polymer as claimed in claim 1 wherein the polyalphaolefin has a weight average molecular weight in the range 2000 to 6000.

7. A graft polymer as claimed in claim 1 wherein the polyalphaolefin has a polydispersity of from about 1.4 to about 3.0.

8. A graft polymer as claimed in claim 1 wherein the polyalphaolefin is a homopolymer of a $C_{10}$ olefin or a copolymer of a $C_{10}$ and a $C_{12}$ olefin.

9. A graft polymer as claimed in claim 1 wherein the polyalphaolefin is a homopolymer of 1-decene.

10. A graft polymer as claimed in claim 1 wherein the graftable monomer is 1-vinylimidazole.

11. A graft polymer as claimed in any one of claim 1 wherein the organo-metallic compound is an organo-molybdenum compound.

12. A graft polymer as claimed in claim 1 wherein the organo-metallic compound is an organo-titanium compound.

13. A lubricating oil composition comprising a major amount of a base oil and a minor amount of the graft polymer as claimed in claim 1.

14. A lubricating oil composition as claimed in claim 13 wherein the graft polymer is present in the lubricating oil composition in an amount of from about 0.2% to about 5% by weight (not including any base oil carried over from the making of the grafted polymer).

15. A graft polymer as claimed in claim 1 wherein the graftable monomer is selected from the group consisting of 1-vinylimidazole, 1-vinyl-2-pyrrolidinone, N-allylimidazole, 1-vinylpyrrolidinone, 2-vinylpyridine, N-methyl-N-vinylacetamide, diallyl formamide, N-methyl-N-allyl formamide, N-ethyl-N-allyl formamide, N-cyclohexyl-N-allyl formamide, 4-methyl-5-vinyl thiazole; N-allyl diisooctyl phenothiazine; 2-methyl-1-vinylimidazole, 3-methyl-1-vinylpyrazole, N-vinylpurine, N-vinylpiperazines, vinylpiperidines, vinylmorpholines, and combinations thereof.

16. A graft polymer as claimed in claim 11 wherein the organo-molybdenum compound is selected from the group consisting of molybdenum boro neodecanoate, molybdenum 2-ethylhexanoate 4-nonyloxybenzoate, molybdenum (isosterate) (4-nonyloxybenzoate), molybdenum dodecylbenzenesulfonate, molybdenum $C_{18}$ branched-linear carboxylate, molybdenum $C_{36}$ linear carboxylate, molybdenum $C_{36}$+-$C_{18}$ branched-linear carboxylate, molybdenum $C_{36}$ branched-linear carboxylate, molybdenum $C_{36}/C_{36}$+ linear carboxylate, molybdenum $C_{36}$+ branched alkyl carboxylate/t-butyl benzoate, molybdenum $C_{18}$ branched alkyl carboxylate/t-butyl benzoate, molybdenum oleate, molybdenum $C_{18}$ linear alkyl carboxylate/t-butyl benzoate, molybdenum octoate, molybdenum acetylacetonate, and combinations thereof.

17. A graft polymer as claimed in claim 16 wherein the organo-molybdenum compound is molybdenum acetylacetonate.

18. A graft polymer as claimed in claim 16 wherein the organo-molybdenum compound is molybdenum octoate.

19. A graft polymer as claimed in claim 16 wherein the organo-molybdenum compound is molybdenum boro neodecanoate.

20. A graft polymer as claimed in claim 12 wherein the organo-titanium compound is selected from the group consisting of titanium diisopropoxide bis(acetylacetonate), titanium (IV) 2-ethylhexoxide, titanium (IV) isopropoxide, titanium methoxide, titanium ethoxide, titanium (IV) propoxide, titanium (IV) tert-butoxide, and combinations thereof.

21. A graft polymer as claimed in claim 20 wherein the organo-titanium compound is titanium diisopropoxide bis (acetylacetonate).

22. A graft polymer as claimed in claim 1 wherein the organo-metallic compound is an organo-manganese compound.

23. A graft polymer as claimed in claim 22 wherein the organo-manganese compound is selected from the group consisting of manganese oleate, manganese linoleate, manganese octoate, manganese acetate, manganese stearate, manganese II 2,4-pentanedioate, manganese III 2,4-pentanedioate, and combinations thereof.

24. A graft polymer as claimed in claim 23 wherein the organo-manganese compound is manganese oleate.

* * * * *